United States Patent [19]

Marrah et al.

[11] Patent Number: 4,932,058
[45] Date of Patent: Jun. 5, 1990

[54] PILOT CANCELLATION CIRCUIT

[75] Inventors: Jeffrey J. Marrah; Gregory J. Manlove, both of Kokomo; Richard A. Kennedy, Russiaville, all of Ind.

[73] Assignee: Delco Electronics Corporation, Kokomo, Ind.

[21] Appl. No.: 393,497

[22] Filed: Aug. 14, 1989

[51] Int. Cl.$^5$ .............................................. H04H 5/00
[52] U.S. Cl. ............................................ 381/13; 381/7
[58] Field of Search ........................ 381/2, 3, 4, 7, 13

[56] References Cited

U.S. PATENT DOCUMENTS 4,569,072  2/1986  Van Roermund ................ 381/13
4,723,286  2/1988  Kamp ................................. 381/3
4,860,354  8/1989  Van Roermund ................ 381/10

Primary Examiner—Forester W. Isen
Attorney, Agent, or Firm—Albert F. Duke

[57] ABSTRACT

A switched capacitor pilot cancellation circuit included in an FM stereo decoder signal path which substantially eliminates the 19 kHz pilot from the FM composite by subtracting a reconstructed pilot frequency signal from the FM composite. The reconstructed pilot signal is obtained by applying the DC output voltage of a pilot magnitude detector to a switched capacitor network which is sampled by clock signals which convert the DC to 19 kHz.

3 Claims, 3 Drawing Sheets

PILOT CANCELLATION CIRCUIT

FIELD OF THE INVENTION

This invention relates to circuits for suppressing the stereo pilot signal component of a stereo composite signal and more particularly to a switched capacitor pilot cancellation circuit for use in a FM stereophonic receiver.

BACKGROUND OF THE INVENTION

FM stereo decoders perform three primary functions. First, the decoder must detect and lock onto the 19kHz pilot signal that is added to the FM composite for synchronization of the transmitter and receiver. Second, the decoder multiplies the FM composite signal by a 38kHz signal that is in phase with the original 19kHz pilot. This multiplication process permits separation of "Left+Right" and the "Left−Right" information with simple low-pass filters. Third, L+R and L−R signals are added and subtracted to give the desired "Left" and "Right" information fed to the speakers of the FM stereo receiver.

It is desirable to eliminate the pilot energy from the signal path in the FM stereo receiver for two reasons. First, the 19kHz signal can be heard by some listeners, and second, the presence of the pilot may cause the audio amplifiers to clip during large signal conditions.

The standard approach to eliminating the pilot is to place a high Q notch filter in the signal path. This approach can cause problems in both the stop band as well as the pass band. Due to component mismatch and temperature effects, the accuracy of the center frequency of the notch is, in general, poorly controlled. This results in unpredictable pilot rejection. In the pass band, the notch filter can cause gain errors which result in the L+R amplitude varying from that of the L−R amplitude. This gain error results in a loss in stereo separation. Because of the circuit complexities, many decoder systems do not even attempt to cancel the pilot.

SUMMARY OF THE INVENTION

In accordance with the present invention a pilot cancellation circuit is provided which eliminates the pilot by adding a reconstructed pilot frequency signal back into the signal path, but 180 degrees out of phase with the pilot component of the FM composite signal. This approach eliminates the need for complex notch filters and their associated problems. The pilot cancellation stage of the present invention is included in the stereo decoder signal path. The inputs to the stage are the FM composite signal and a DC voltage which is proportional to the magnitude of the pilot within the FM composite signal.

The pilot cancellation circuit is basically a switched capacitor unity gain stage with two inputs. One input is the FM composite signal, which is sampled with a simple 50% duty cycle clock. The other input is the DC voltage obtained from a 19kHz pilot magnitude detector circuit. This input is sampled with special clock signals that convert the DC to 19kHz. The circuit acts as a summing node for these two inputs so that the 19kHz component of the composite is substantially eliminated in the output of the circuit.

With the foregoing in mind, it is an object of the present invention to provide a relatively simple but accurate means of suppressing a pilot signal.

It is another object of the present invention to provide a pilot cancellation circuit that is readily producible utilizing integrated circuit processes.

BRIEF DESCRIPTION OF THE DRAWINGS

The above and other advantages of the invention will become more apparent from the following description taken in, conjunction with the accompanying drawings wherein like references refer to like parts and wherein.

DESCRIPTION OF THE PREFERRED EMBODIMENT

Figure 1:
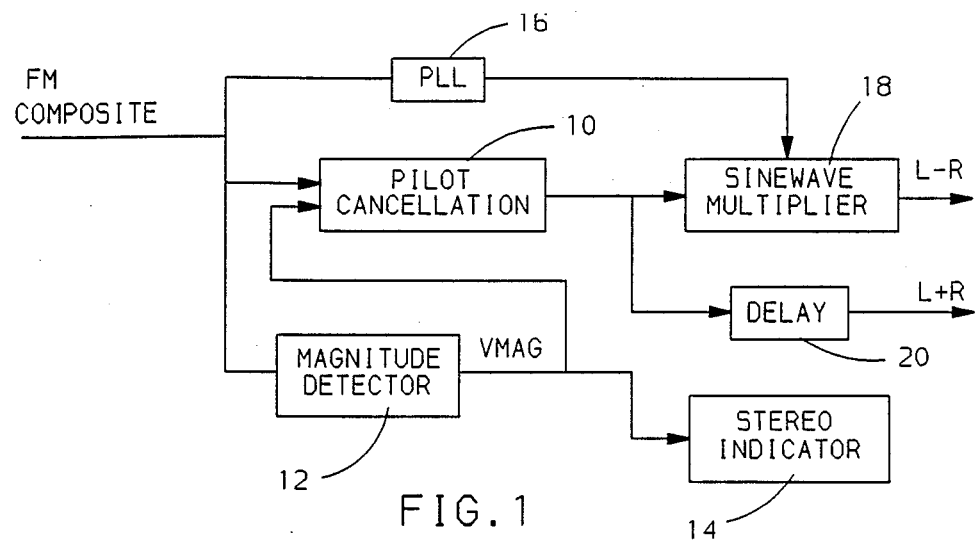
FIG. 1 is a block diagram showing the pilot cancellation stage, of the present invention in the signal path of a stereo decoder.

Referring now to FIG. 1 the pilot cancellation circuit of the present invention is generally designated 10 and is located in the stereo decoder signal path. The two inputs to the circuit are the FM composite signal and the output of the 19kHz pilot magnitude detector 12. The magnitude detector 12 generates a DC voltage which is proportional to the magnitude of the 19kHz pilot within the FM composite signal and controls a stereo indicator generally designated 14. A phased locked loop (PLL) generally designated 16 provides a 38kHz signal, phased locked to the 19kHz pilot, which is input to a sine wave multiplier generally designated 18. The output of the pilot cancellation circuit 10, which is essentially the FM composite with the 19kHz pilot component removed, provides the other input to the multiplier 18 as well as providing the input to a delay block designated 20. The L+R signal is provided at the output of the delay block 20 while the L−R signal is provided at the output of the multiplier 18. The magnitude detector 12 and PLL 16 are described in greater detail in patent applications G-1784 and G-1804 respectively, assigned to the assignee of the present invention and are incorporated herein. Reference may be had thereto for further details if desired. The magnitude detector 12 as well as the pilot cancellation stage 10 are switched capacitor circuits which are controlled by clock signal obtained from the PLL 16.

Figure 3:
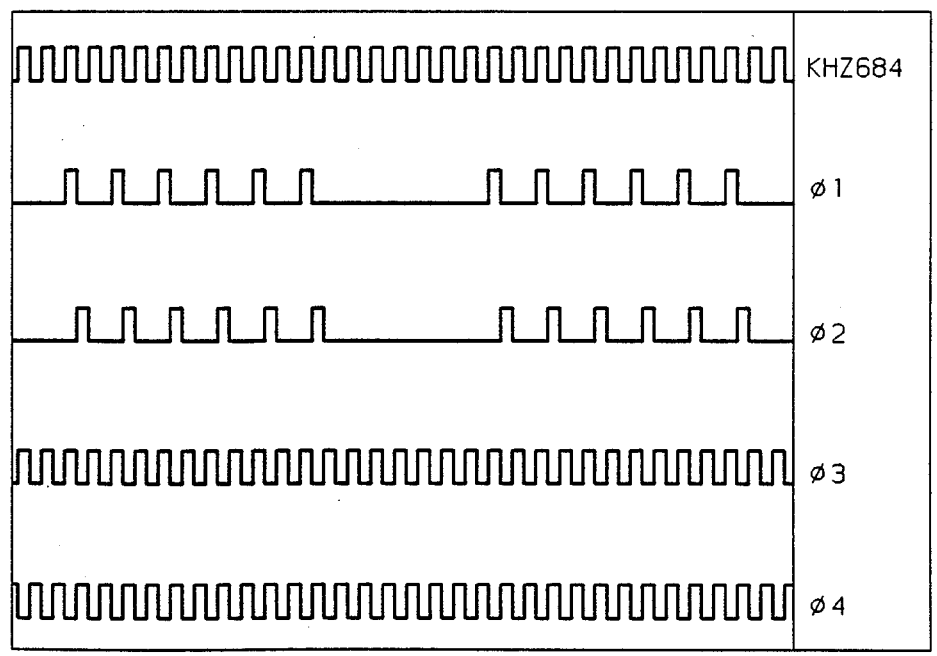
FIGS. 3 and 4 are waveforms useful in understanding the operation of the present invention.
Figure 2:
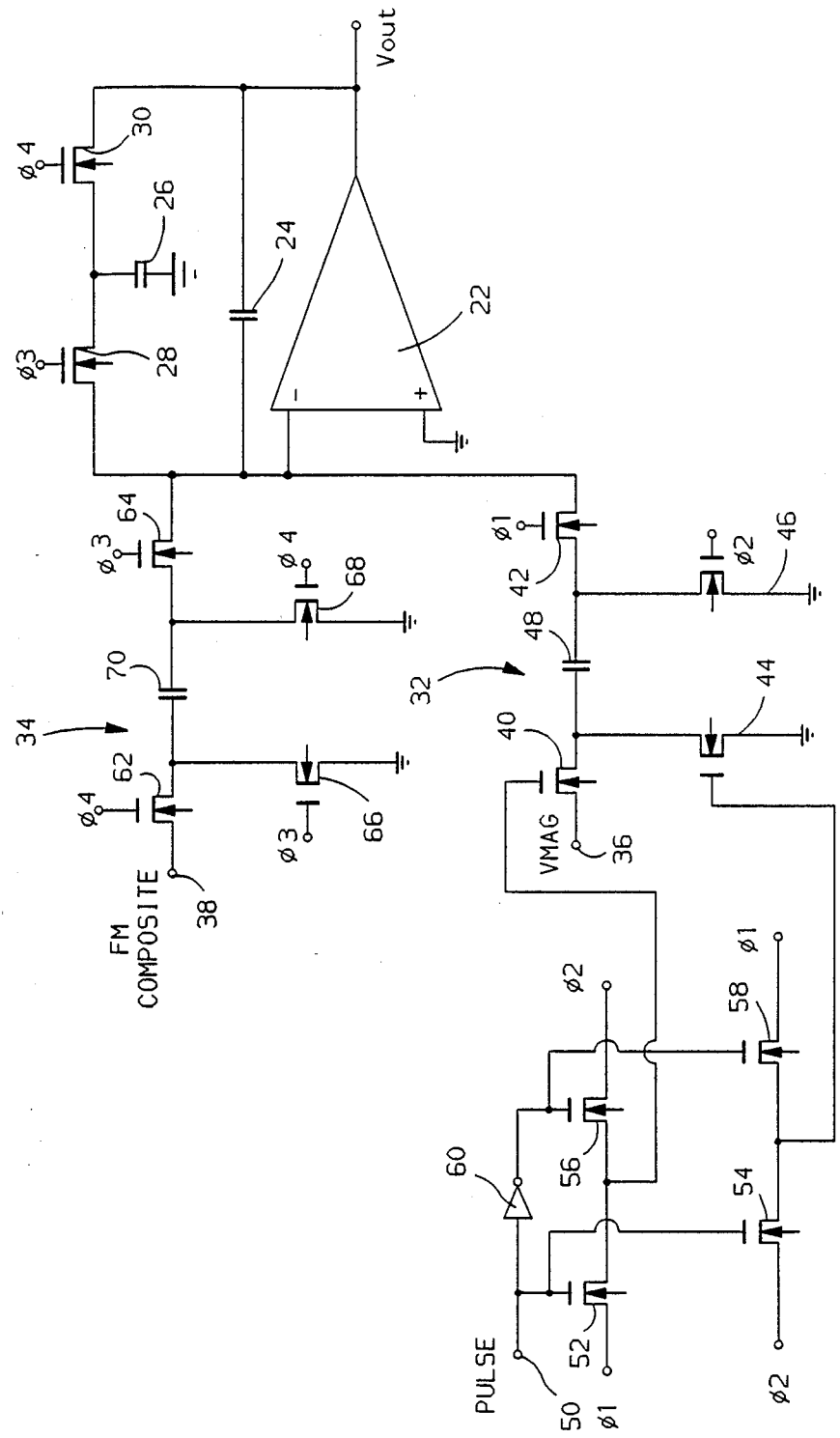
FIG. 2 is a detailed schematic diagram of the circuit of the present invention.

The pilot cancellation stage 10 is a switched capacitor summer with a gain of unity as shown in FIG. 2. The stage 10 comprises an amplifier 22 and feedback capacitor 24 with an equivalent resistor formed by capacitor 26 and switches 28, 30. The outputs of switched capacitor networks generally designated 32 and 34 are summed at the negative input of amplifier 22. The DC input designated VMAG is obtained from the output of magnitude detector 12 and is applied to input terminal 36 of network 32 and sampled with clock signals Φ1 and Φ2. The clock signals Φ1 and Φ2 convert VMAG to a 19kHz signal of the same amplitude but 180 degrees out of phase with the 19kHz component of the FM composite signal. The FM composite signal is applied to input 38 of network 34 and is sampled with non-overlapping 50% duty cycle clock signals designated Φ3 and Φ4. The clock signals Φ1–Φ4 are shown in FIG. 3 and are derived from clock generating means within the PLL circuitry 16 of the FM decoder as described in the aforementioned patent applications. The clock generating means includes logic circuitry which responds to an input clock operating at a frequency which is a multiple of 12 times the 19kHz pilot signal. In the preferred embodiment the input clock operates at a frequency of 684kHz. The switches in the circuit are shown as N-channel devices to simplify the schematic. Preferably CMOS transmission gates are employed.

Figure 4:
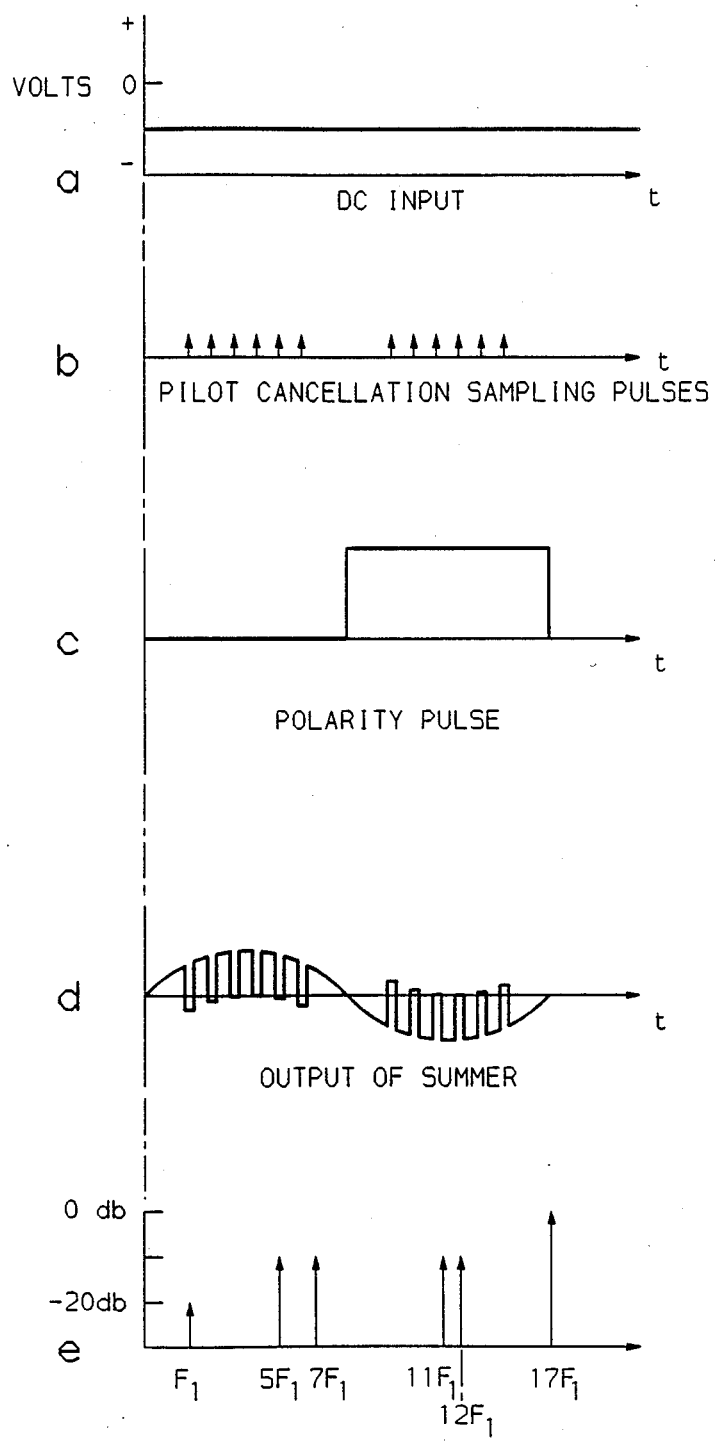

Switches 40, 42, 44, 46 control the switching of capacitor 48 in response to clock signals Φ1 and Φ2. Φ1 is applied continuously to the gate of switch 42 while Φ2 is applied continuously to the gate of switch 46. Φ1 and Φ2 are applied to the gates of switches 40 and 44 under the control of a polarity signal which is synchronized with the 19kHz pilot signal and switches levels at the zero crossing of the pilot as shown in FIG. 4. The polarity signal is applied to the terminal 50 and directly controls switches 52,54. The polarity signal controls switches 56, 58 through an inverter 60. Thus, during one half cycle of the polarity signal, Φ1 is applied to switch 40 and Φ2 is applied to switch 44. During the next half cycle Φ2 is applied to switch 40 and Φ1 is applied to switch 44.

The network 34 includes switches 62, 64, 66, 68 which control capacitor 70 and are clocked from signals Φ3 and Φ4. The network 34 forms an equivalent resistor which couples a sampled data version of the FM composite to the summing junction at the negative input of amplifier 22.

Referring now to FIG. 4a, the DC input VMAG is obtained from the output of the magnitude detector 12 as described in the aforementioned patent application G-1784. The sampling scheme shown in FIG. 4b is the same as that used in the magnitude detector 12 and exhibits a frequency component at 19kHz as well as other frequencies above the bandwidth of the composite FM signal. As explained in G-1784, by sampling the 19kHz pilot during the times shown in FIG. 4b a DC output VMAG is obtained which is not affected by the presence of a 57kHz pilot.

The pilot cancellation stage 10 uses the same sampling scheme to reconstruct the 19kHz pilot from the VMAG output of the magnitude detector 12. A high Q cancellation of the 19kHz pilot in the FM composite, will result if the 19kHz component present in the clocking pulses is added back into the signal path with the opposite phase and same amplitude as the pilot signal. The phase of the 19kHz component in the sample pulses, added back into the signal path, is set by the phasing of the input clocks under the control of the polarity signal shown in FIG. 4c. The polarity signal is 180 degrees out of phase with the polarity signal used in the magnitude detector 12. The amplitude of the 19kHz component, added back into the signal path, is controlled by the value VMAG. The output of the pilot cancellation stage 10 is shown in FIG. 4d. For purposes of clarity FIG. 4d show the case where the composite contains only the 19kHz pilot. FIG. 4e shows that the 19kHz component of the output of the pilot cancellation stage 10 has been reduced by approximately 20db.

The pilot cancellation stage uses exactly the inverse technique in generating a 19kHz signal as the magnitude detector 12 uses to generate the DC voltage proportional to the pilot. Therefore, use of the DC output of the magnitude detector circuit permits essentially a reconstruction of the 19kHz pilot and subsequent ideal cancellation of the pilot component of the FM composite. Furthermore, because the one operation is the inverse of the other, there are no spurious frequency components (which will be perceived as noise) injected into the signal path, within the bandwidth of the FM composite.

The embodiments of the invention in which an exclusive property or privilege is claimed are defined as follows:

1. A pilot cancellation circuit comprising a first input adapted to receive an FM composite signal containing a pilot component, a second input adapted to receive a DC voltage proportional to said pilot component, a summing junction, a first switched capacitor network connected between said first input and said summing junction, a second switched capacitor network connected between said second input and said summing junction, amplifier means having a first input terminal connected with said summing junction, a second input terminal connected to a voltage reference, and an output, clock means applying a pair of non-overlapping clock signals to said first network to sample said composite signal at a predetermined sample rate at a multiple of the frequency of said pilot signal, said clock means applying a second pair of non-overlapping clock signals to said second network, said second pair of clock signals substantially lacking any third harmonic component of said pilot signal, whereby the output of said operational amplifier means is an FM composite with the pilot signal substantially eliminated.

2. A stereo pilot cancellation circuit comprising first and second switched capacitor networks each including first and second capacitors and four control switches respectively, amplifier means having an input port and an output port, means applying an FM composite signal containing a pilot signal component to said first network, means connecting a dc signal representing the magnitude of said pilot signal to said second network, a summing junction connecting the output of said first and second networks to the input of said amplifier means, clock means applying a first pair of non-overlapping clock signals to said first network to sample said composite signal at a predetermined sample rate, said clock means applying a second pair of non-overlapping clock signals to said second network to produce a sampled data signal of substantially the same frequency and amplitude as said pilot signal and 180 degrees out of phase therewith, whereby the output of said circuit is an FM composite signal with the pilot signal substantially eliminated.

3. A pilot cancellation circuit comprising a first input adapted to receive an FM composite signal containing a pilot component, pilot magnitude detector means comprising a switched capacitor low pass filter for producing a DC voltage proportional to said pilot component, a second input adapted to receive said DC voltage, amplifier means having first and second input nodes and an output node, said second input node connected to a voltage reference, a first switched capacitor network connected between said first input and said first input node of said amplifier, a second switched capacitor network connected between said second input and said first input node of said amplifier, clock means applying a pair of non-overlapping clock signals to said first network to sample said composite signal at a predetermine sample rate at a multiple of the 12 times the frequency of said pilot signal, said clock means applying a second pair of non-overlapping clock signals to said second network, said second pair of clock signal substantially lacking any third harmonic component of said pilot signal, whereby the output of said operational amplifier means is an FM composite with the pilot signal substantially eliminated.

* * * * *